Patented Aug. 12, 1941

2,251,946

UNITED STATES PATENT OFFICE 2,251,946

ESTERS AND AMIDES OF UNSATURATED ACIDS

William A. Lott, East Orange, N. J., assignor to E. R. Squibb & Sons, New York, N. Y., a corporation of New York No Drawing. Application October 7, 1939, Serial No. 298,405

9 Claims. (Cl. 260—455)

This invention relates to, and has for its object the provision of: (1) bases of the general formula

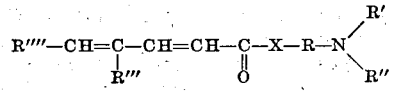

wherein R' and R'' represent, each, hydrogen, alkyl (especially lower alkyl), or aralkyl, R represents alkylene (especially lower alkylene) or substituted alkylene, R''' and R'''' represent, each, hydrogen or alkyl (especially lower alkyl), and X represents O, S, or NH; and (2) the acid-addition salts thereof. These compounds, especially those in which R''' is hydrogen and R'''' is methyl, are characterized by valuable local-anesthetic properties. They may be prepared by reacting an acid halide of the general formula

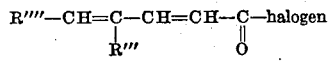

wherein R''' and R'''' have the above-given meanings—e. g., sorbyl halide (sorbic acid halide)—with a compound of the general formula

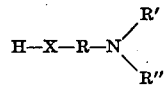

wherein X, R, R', and R'' have the above-given meanings—i. e., with an amino-alcohol, amino-mercaptan, or diamine—to form the ester, thiolic-acid ester, or amide, respectively.

The compounds of this invention are usually recovered in the form of their acid-addition salts with hydrochloric acid, but the bases may be converted into acid-addition salts generally—inter alia, the hydrohalide, sulfate, oxalate, phosphate, tartrate, borate, citrate, nitrate, lactate, and picrate—by methods well known in the art, e. g., by dissolving the base in ether or other suitable organic solvent, adding an equivalent quantity of the acid, and evaporating the solution until crystallization ensues or until completely dry; and the acid-addition salts, e. g., the hydrochloride, may be converted into the corresponding bases by careful neutralization of an aqueous solution thereof with NaOH, for example.

The following examples are illustrative of the invention:

Example 1

A solution of 5.6 g. sorbyl chloride in 10 cc. anhydrous benzene is added dropwise to a solution of 5 g. β-diethylamino-ethanol in 10 cc. dry benzene; 30 cc. additional anhydrous benzene is added to redissolve the crystalline product which separates, and the reaction mixture is refluxed for one hour; on cooling, a crystalline product separates, which is filtered from the mother liquor and recrystallized from benzene containing a small amount of absolute ethanol, and the recrystallization repeated, yielding a product melting at about 133–136° C.; on further recrystallizing this product from anhydrous acetone, the desired β-diethylamino-ethyl sorbate hydrochloride is obtained as a white crystalline material melting at 139–140° C.

Example 2

A solution of 3.1 g. sorbyl chloride (a 10% excess) in 20 cc. anhydrous ether is added slowly to a solution of 3.7 g. β-(N-methyl-N-phenethyl)-amino-ethanol in 20 cc. anhydrous ether; an orange-colored oily precipitate separates, and the ether is removed by distillation (finally in vacuo); the residue is then dissolved in dilute hydrochloric acid solution, and the solution extracted three times with ether and alkalinized to separate the desired base, β-(N-methyl-N-phenethyl)-amino-ethyl sorbate, which is dissolved in ether; the solution is dried over anhydrous potassium carbonate, and a very slight excess of an ether solution of HCl is added, whereupon the desired salt, β-(N-methyl-N-phenethyl)-amino-ethyl sorbate hydrochloride, separates as an oily material. By thorough desiccation in a vacuum, the product is obtained as a light-straw-colored viscous syrup.

Example 3

A solution of 5.3 g. sorbyl chloride (a 5% excess) in 5 cc. anhydrous ether is added to a solution of 8.5 g. 1-phenyl-2-diethylamino-1,3-propanediol in 40 cc. ether, while agitating and externally cooling; the reaction mixture is refluxed for four hours with continued agitation, and on standing overnight a glassy, resinous semi-solid settles out; the whole reaction mixture is transferred to a freezing bath, and the resinous material ground to a fine powder under the mother liquor; and after filtering, washing the material with several portions of anhydrous ether, and recrystallizing from acetone, the product, 1-phenyl-2-diethylamino-1,3-propanediol mono-sorbate hydrochloride, is obtained as a white crystalline material melting at 151–153° C.

Example 4

A solution of 13 g. sorbyl chloride in 25 cc. dry benzene is added dropwise, with agitation and external cooling, to a solution of 11.6 g. unsymmetrical diethyl-ethylenediamine in 75 cc. anhydrous benzene; the reaction mixture is then refluxed for two hours, allowed to cool, and extracted four times with 50 cc. of a 2% hydrochloric acid solution; the acidulated aqueous extracts are composited and alkalinized with a slight excess of sodium hydroxide, whereupon the desired base, N-(β-diethylamino-ethyl)-sorbamide, separates as an oily material, which is dissolved in benzene, and extracted several times with small portions of water; the benzene layer is then dried over anhydrous potassium carbonate, and treated with a very slight excess of an ether solution of dry HCl; on concentrating and cooling, the desired salt, N-(β-diethyl-amino-ethyl)-sorbamide hydrochloride separates, and is obtained as a white crystalline material from anhydrous acetone.

*Example 5*

β-diethylamino-ethyl thiolsorbate hydrochloride is obtained by reacting sorbyl chloride with β-diethylamino-ethyl mercaptan in the manner detailed in Example 1.

Other compounds embraced by the general formula given hereinabove may be prepared: (a) by similarly reacting a sorbyl halide with other amino-alcohols, amino-mercaptans, or diamines, or (b) using a different acid halide embraced by the general formula given hereinbefore in place of sorbyl halide.

(a) For example, β-butylamino-ethyl sorbate hydrochloride may be prepared from β-butyl-amino-ethanol in the manner described in Example 1; N-(gamma-diethylamino-β,β-dimethyl-propyl)-sorbamide hydrochloride may be prepared from gamma-diethylamino-β,β-dimethyl-propyl amine in the manner described in Example 4; gamma-dimethyl-amino-propyl sorbate hydrochloride may be prepared from gamma-dimethylamino-propanol in the manner described in Example 1; and gamma-diethylamino-β,β-dimethyl-propyl sorbate hydrochloride may be prepared from gamma-diethylamino-β,β-dimethyl-propanol in the manner described in Example 1.

(b) Acid halides of the following acids, for example, may be used in place of sorbyl halide to prepare the corresponding esters, thiolic-acid esters, or amides:

$$CH_2=CH-CH=CH-COOH$$

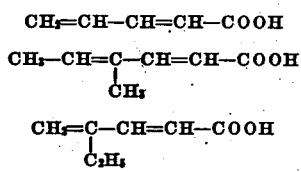

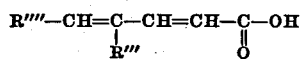

The acids of the general formula $$R''''-CH=C-CH=CH-C-OH$$
$$\phantom{R''''-CH=C}|\phantom{-CH=CH-}\|$$
$$\phantom{R''''-CH=}R'''\phantom{-CH=CH-}O$$

wherein R''' and R'''' each represent hydrogen or alkyl, may be prepared by reacting acrylic aldehyde, or an α and/or β alkyl-substituted acrylic aldehyde (e. g. crotonaldehyde) with malonic acid by the method of Doebner, Ber. 33, 2140. The acids are then converted into the acid halides in the conventional manner, e. g. by reaction with thionyl chloride.

The invention may be variously otherwise embodied within the scope of the appended claims.

I claim:

1. A compound of the group consisting of: bases of the general formula

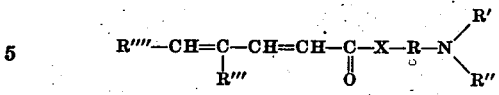

wherein R' and R'' represent, each, a member of the group consisting of hydrogen, alkyl, and aralkyl, R represents a member of the group consisting of alkylene and substituted alkylene, R''' and R'''' represent, each, a member of the group consisting of hydrogen and alkyl, and X represents a member of the group consisting of O, S, and NH; and acid-addition salts thereof.

2. An acid-addition salt of a base of the general formula

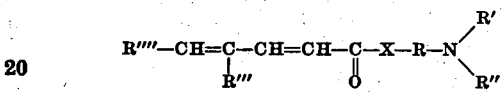

wherein R' and R'' represent, each, a member of the group consisting of hydrogen, alkyl, and aralkyl, R represents a member of the group consisting of alkylene and substituted alkylene, R''' and R'''' represent, each, a member of the group consisting of hydrogen and alkyl, and X represents a member of the group consisting of O, S, and NH.

3. An acid-addition salt of a base of the general formula

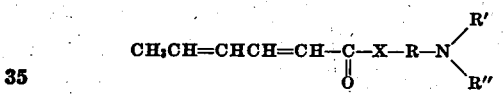

wherein R' and R'' represent, each, a member of the group consisting of hydrogen, alkyl, and aralkyl, R represents a member of the group consisting of alkylene and substituted alkylene, and X represents a member of the group consisting of O, S, and NH.

4. An acid-addition salt of a base of the general formula

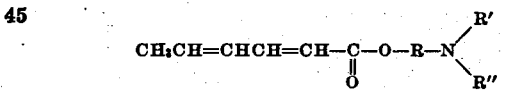

wherein R' and R'' represent, each, a member of the group consisting of hydrogen, alkyl, and aralkyl, and R represents a member of the group consisting of alkylene and substituted alkylene.

5. An acid-addition salt of a base of the general formula

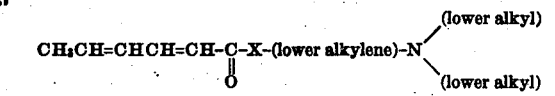

wherein X represents a member of the group consisting of O, S, and NH.

6. β-diethylamino-ethyl sorbate hydrochloride.

7. β-(N - methyl - N - phenethyl) -amino-ethyl sorbate hydrochloride.

8. N-(β-diethylamino-ethyl)-sorbamide hydrochloride.

9. The process of preparing a compound of the general formula

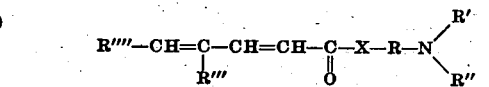

wherein R' and R'' represent, each, a member of the group consisting of hydrogen, alkyl, and aralkyl, R represents a member of the group consisting of alkylene and substituted alkylene, R''' and R'''' represent, each, a member of the group consisting of hydrogen and alkyl, and X represents a member of the group consisting of O, S, and NH, which comprises reacting an acid halide of the general formula $$R''''-CH=\underset{\underset{R''}{|}}{C}-CH=CH-\underset{\underset{O}{\|}}{C}-\text{halogen}$$

wherein R''' and R'''' have the foregoing meaning, with a compound of the general formula $$H-X-R-N\underset{R''}{\overset{R'}{\diagup}}$$

wherein R, R', R'', and X have the foregoing meaning.

WILLIAM A. LOTT.